(12) United States Patent
Thomsen, III et al.

(10) Patent No.: US 11,724,834 B2
(45) Date of Patent: *Aug. 15, 2023

(54) ATOMIC NUMBER (Z) GRADE SHIELDING MATERIALS AND METHODS OF MAKING ATOMIC NUMBER (Z) GRADE SHIELDING

(71) Applicant: UNITED STATES OF AMERICA AS REPRESENTED BY THE ADMINISTRATOR OF NASA, Washington, DC (US)

(72) Inventors: Donald L. Thomsen, III, Yorktown, VA (US); Sankara N. Sankaran, Yorktown, VA (US); Joel A. Alexa, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 241 days.

This patent is subject to a terminal disclaimer.

(21) Appl. No.: 17/176,710

(22) Filed: Feb. 16, 2021

(65) Prior Publication Data

US 2021/0188464 A1    Jun. 24, 2021

Related U.S. Application Data

(63) Continuation of application No. 16/385,643, filed on Apr. 16, 2019, now Pat. No. 10,919,650, which is a
(Continued)

(51) Int. Cl.
*B64G 1/58*    (2006.01)
*B32B 15/01*   (2006.01)
(Continued)

(52) U.S. Cl.
CPC .............. *B64G 1/58* (2013.01); *B32B 15/017* (2013.01); *B64G 1/543* (2013.01); *B64G 1/546* (2013.01);
(Continued)

(58) Field of Classification Search
CPC ........................................................ B64G 1/58
See application file for complete search history.

(56) References Cited

U.S. PATENT DOCUMENTS 3,239,669 A    3/1966   Weinberger
3,924,261 A   12/1975   Kardashian
(Continued)

OTHER PUBLICATIONS

Pinedu, S. et al., "Study and Realization of Titanium-Tantalum Junctions Sodaed by High Temperature Diffusion (B55-920 C): Influence of Temperature, Time, Pressure and Roughness Parameters on the Mechanical Properties and Optimization of the Welding Conditions," Joural of Less-Common Metals, 1985, pp. 169-196, vol. 109.
(Continued)

*Primary Examiner* — William D Young
(74) *Attorney, Agent, or Firm* — Shawn P. Gorman; Robin W. Edwards; Trenton J. Roche

(57) ABSTRACT

In some aspects, this disclosure relates to improved Z-grade materials, such as those used for shielding, systems incorporating such materials, and processes for making such Z-grade materials. In some examples, the Z-grade material includes a diffusion zone including mixed metallic alloy material with both a high atomic number material and a lower atomic number material. In certain examples, a process for making Z-grade material includes combining a high atomic number material and a low atomic number material, and bonding the high atomic number material and the low atomic number together using diffusion bonding. The processes may include vacuum pressing material at an elevated
(Continued)

temperature, such as a temperature near a softening or melting point of the low atomic number material. In another aspect, systems such as a vault or an electronic enclosure are disclosed, where one or more surfaces of Z-grade material make up part or all of the vault/enclosure.

20 Claims, 12 Drawing Sheets

Related U.S. Application Data continuation of application No. 15/225,279, filed on Aug. 1, 2016, now abandoned.

(60) Provisional application No. 62/368,248, filed on Jul. 29, 2016, provisional application No. 62/240,604, filed on Oct. 13, 2015, provisional application No. 62/199,032, filed on Jul. 30, 2015.

(51) Int. Cl.
| | |
|---|---|
| C23C 4/134 | (2016.01) |
| C23C 4/137 | (2016.01) |
| C22C 14/00 | (2006.01) |
| B64G 1/54 | (2006.01) |
| C23C 4/08 | (2016.01) |
| C23C 28/02 | (2006.01) |
| G21F 1/12 | (2006.01) |

(52) U.S. Cl.
CPC ............ *C22C 14/00* (2013.01); *C23C 4/08* (2013.01); *C23C 4/134* (2016.01); *C23C 4/137* (2016.01); *C23C 28/028* (2013.01); *G21F 1/12* (2013.01); *G21F 1/125* (2013.01)

(56) References Cited

U.S. PATENT DOCUMENTS

| | | | |
|---|---|---|---|
| 4,795,654 A | 1/1989 | Teleki | |
| 4,938,233 A | 7/1990 | Orrison, Jr. | |
| 5,416,278 A | 5/1995 | Ostrem | |
| 5,483,100 A | 1/1996 | Marrs et al. | |
| 5,557,142 A | 9/1996 | Gilmore | |
| 5,891,528 A | 4/1999 | Turek et al. | |
| 5,965,829 A | 10/1999 | Haynes | |
| 6,048,379 A | 4/2000 | Bray et al. | |
| 6,256,999 B1 | 7/2001 | Chase | |
| 6,281,515 B1 | 8/2001 | Demeo et al. | |
| 6,459,091 B1 | 10/2002 | Demeo et al. | |
| 6,583,432 B2 | 6/2003 | Featherby et al. | |
| 6,674,087 B2 | 1/2004 | Cadwalader et al. | |
| 6,828,578 B2 | 12/2004 | Demeo et al. | |
| 6,841,791 B2 | 1/2005 | Demeo et al. | |
| 6,893,596 B2 | 5/2005 | Haas et al. | |
| 6,967,343 B2 | 11/2005 | Batten | |
| 7,148,084 B2 | 12/2006 | Strobel et al. | |
| 7,175,803 B2 | 2/2007 | Artig et al. | |
| 7,196,023 B2 | 3/2007 | Langley et al. | |
| 7,274,031 B2 | 9/2007 | Smith | |
| 7,476,889 B2 | 1/2009 | Demeo et al. | |
| 7,595,112 B1 | 9/2009 | Cano et al. | |
| 7,718,984 B2 | 5/2010 | Edwards et al. | |
| 7,851,062 B2 | 12/2010 | Hales et al. | |
| 8,234,014 B1 | 7/2012 | Ingle | |
| 8,367,233 B2 | 2/2013 | Hermann | |
| 8,536,684 B2 | 9/2013 | Chen | |
| 2007/0035033 A1 | 2/2007 | Ozguz | |
| 2007/0248866 A1 | 10/2007 | Osenar | |
| 2008/0245978 A1 | 10/2008 | Yanke | |
| 2008/0249753 A1 | 10/2008 | Wilson et al. | |
| 2010/0086729 A1 | 4/2010 | Long | |
| 2012/0023737 A1* | 2/2012 | Thomsen, III | C23C 4/18 205/183 |
| 2012/0273622 A1* | 11/2012 | Long | G21F 7/00 244/171.7 |
| 2016/0314862 A1 | 10/2016 | Kim | |

OTHER PUBLICATIONS

Calvo, F. A. et al., "Diffusion Bonding of Ti—6Al—4V Alloy at Low Temperature: Metallurgical Aspects," Journal of Materials Science, 1992, pp. 391-398, vol. 27.
A Consensus Study Report of the National Academies of Sciences, Engineering, Medicine, Open Source Software Policy Options for NASA Earth and Space Sciences, The National Academies Press, 2018. , pp. 1-109.

* cited by examiner

Ti Kα1

5mm

Ta Lα1

5mm

ATOMIC NUMBER (Z) GRADE SHIELDING MATERIALS AND METHODS OF MAKING ATOMIC NUMBER (Z) GRADE SHIELDING

CROSS-REFERENCE TO RELATED PATENT APPLICATIONS

This patent application is a continuation of U.S. patent application Ser. No. 16/385,643, filed Apr. 16, 2019, and titled "Atomic Number (Z) Grade Shielding Materials and Methods of Making Atomic Number (Z) Grade" which is a continuation of U.S. patent application Ser. No. 15/225,279, filed Aug. 1, 2016, and titled "Atomic Number (Z) Grade Shielding Materials and Method of Making Atomic Number (Z) Grade Shielding", and claimed the benefit of and priority to U.S. Provisional Patent Application No. 62/199,032, filed on Jul. 30, 2015, and titled "Additional Methods of Making Z-Grade,"; U.S. Provisional Patent Application No. 62/240,604, filed on Oct. 13, 2015, and titled "Additional Methods of Making Z-Grade,"; and U.S. Provisional Patent Application No. 62/368,248, filed on Jul. 29, 2016, and titled "Additional Methods of Making Z-Grade," where the contents of each application are hereby incorporated by reference in their entirety for any and all non-limiting purposes.

STATEMENT REGARDING FEDERALLY SPONSORED RESEARCH OR DEVELOPMENT

The invention described herein was made in part by an employee of the United States Government and may be manufactured and used by or for the Government of the United States of America for governmental purposes without the payment of any royalties thereon or therefore.

TECHNICAL FIELD

In some aspects, this disclosure relates to improved Atomic Number (Z) grade ("Z-grade") materials, such as those used for shielding, systems incorporating such materials, such as Z-grade vaults, Z-grade electronic enclosures, and processes of making Z-grade materials.

BACKGROUND

Satellites and instruments, among other things, may require shielding or spot shielding when in orbit or in other environments where there is exposure to radiation. Thus, shielding may increase the lifetime of ionizing radiation sensitive components. Other applications may include piping, housing, or suits designed to protect persons or materials from radiation. In various applications, shielding may help provide hardware design for increased orbital lifetimes, and enable out of low earth orbit (LEO) missions by using shielding for sensitive components. For geotransfer orbit (GTO), however, the radiation levels are around at least 10 times the level of LEO. In Jovian environments, the amount of radiation is still higher.

Z-shields made from Z-grade material may provide cost-effective shielding for such systems by utilizing sheets or pieces of metal with different materials/densities, and thus including different atomic numbers (Z). For example, a higher density metal and lower density metal may be used together. The low atomic number materials slow high energy protons and electrons via collision more effectively without the production of Bremmstrahlung radiation. At lower energies, high atomic number materials can also slow protons and electrons with reduced Bremmstrahlung radiation. At the same time, the ability to use the high atomic number material may reduce the thickness of the overall shielding. As one example, known shielding applications utilize a typical outer skin of larger spacecraft with around 300 mils of aluminum, and combines this with additional spot shielding using higher atomic number materials that takes advantage of inherent low atomic number shielding on the outside surface.

For smaller enclosures, known products may utilize a 50 mil thick aluminum skeleton or shell with limited shield potential. For an enclosure that must last for three to six months (as in many standards missions) or longer, this may be insufficient or may only last for these limited periods.

While some Z-grade applications are known, additional compositions, applications, and synthesis methods may be desired.

SUMMARY

This Summary provides an introduction to some general concepts relating to this disclosure in a simplified form, where the general concepts are further described below in the Detailed Description.

In some aspects, this disclosure relates to improved Z-grade materials and synthesis methods. For example, in one aspect, a Z-grade alloy material is disclosed. In some examples, the Z-grade material includes a high atomic number material, a low atomic number material, where the atomic number of the low atomic number material is lower than the atomic number of the high atomic number material (in some examples, if alloys or other combinations are used for either material, any atomic numbers of the low atomic number material are lower than any atomic numbers of the higher atomic number material). The low atomic number material may be bonded to the high atomic number material. The Z-grade material may include a diffusion zone, the diffusion zone including a mixed metallic alloy material, the alloy material including both the high atomic number material and the lower atomic number material. The use of the disclosed Z-grade materials allows for a one-piece shielding that has sufficient mass thickness (areal density) while reducing the physical thickness (volume) of the shielding. This provides the ability to provide effective radiation shielding in reduced volume or thickness applications such as, for example, small satellites, instrumentation, confined spaces and dimensions, etc.

In some examples, the diffusion zone of the Z-grade material is at least 0.5 mil in thickness, in others it is at least 5 mil in thickness, and in others at least 10 mil in thickness. In certain examples, the thickness of the diffusion zone is equal to at least 10% of a thickness of the thinner of the high atomic number material and the low atomic number material (or both, if they have equal or essentially equal thickness). In other examples, it is essentially equal to the thinner of the two. In still other examples, the diffusion zone is actually thicker than the thinner of the two.

In some embodiments, the high atomic number material comprises one or more of tantalum, tungsten, or a copper-tungsten alloy. In certain examples, the low atomic number material comprises one or more of aluminum or titanium. In some examples, the Z-grade material also includes an aluminum layer bonded the Z-grade material (e.g. bonded to the low atomic number material). In certain examples, the density of the diffusion zone is between or varies between around 4.4 g/cm$^3$ and about 16.7 g/cm$^3$ along the gradient. In some examples, the diffusion zone is a graded metallic alloy.

In some examples, the Z-grade alloy material has an areal density of at least about 3.0 g/cm². In various examples, the alloy material has an overall thickness of the Z-grade alloy material of about 240 mils or less, about 190 mils or less, about 140 mils or less, or about 100 mils or less.

In accordance with another aspect, systems are disclosed. In some examples, the system is a housing, a vault, shield, or an enclosure (such as an electronic enclosure). In some examples, the system is a Z-grade vault. The Z-grade vault may include one or more surfaces of Z-grade material, where the one or more surfaces may include a high atomic number material and a low atomic number material, where the atomic number of the low atomic number material is lower than the atomic number of the high atomic number material, and where the low atomic number material is diffusion bonded to the high atomic number material. In some examples, the areal density of the Z-grade material is at least about 2.5 g/cm², and wherein an overall thickness of the Z-grade alloy material is about 240 mils or less, about 190 mils or less, about 140 mils or less, or about 100 mils or less. In some examples, the areal density of the one or more surfaces of Z-grade material is at least about 3.0 g/cm². In various embodiments, the Z-grade material further comprises an aluminum layer bonded to the low atomic number material.

In accordance with another aspect, processes are disclosed. In some examples, the process may include combining a high atomic number material and a low atomic number material, where the atomic number of the low atomic number material is lower than the atomic number of the high atomic number material, and bonding the high atomic number material and the low atomic number together using diffusion bonding to form a Z-grade material. In various examples, the diffusion bonding includes vacuum pressing the high atomic number material and the lower atomic number material at an elevated temperature.

In some examples, the method further includes (in addition to the diffusion bonding) vacuum pressing the Z-grade material at an elevated temperature. In certain examples, the elevated temperature is near a softening or melting point of the low atomic number material. In various embodiments, the process also includes cooling the Z-grade material under vacuum.

In some embodiments, the diffusion bonding includes plasma spraying the low atomic number material onto a sheet of the higher atomic number material. In certain examples, the diffusion bonding includes welding the low atomic number material onto a sheet of the higher atomic number material using an electronic beam gun. In various embodiments, the diffusion bonding includes heating the low atomic number material under an inert atmosphere or a vacuum to its melting temperature, and coating a sheet (or other piece) of the high atomic number material with the melted low atomic number material. In some examples, the diffusion bonding includes ultrasonic layering of the low atomic number material onto the high atomic number material.

In various examples of the process, the high atomic number material includes one or more of tantalum, tungsten, or a copper-tungsten alloy, and the low atomic number material comprises one or more of aluminum, titanium and vanadium. In certain examples, the formed Z-grade material includes a diffusion zone, where the diffusion zone includes a mixed metallic alloy material, the alloy material including both the high atomic number material and the lower atomic number material.

These summary descriptions are merely provide examples of the processes and/or process steps that may be performed in one or more embodiments. In certain embodiments, materials and methods include additional combinations or substitutions. To that end, other details and features will be described in the sections that follow. Any of the features discussed in the embodiments of one aspect may be features of embodiments of any other aspect discussed herein. Moreover, additional and alternative suitable variations, features, aspects and steps will be recognized by those skilled in the art given the benefit of this disclosure.

These and other features, advantages, and objects of the present invention will be further understood and appreciated by those skilled in the art by reference to the following specification, claims, and appended drawings.

BRIEF DESCRIPTION OF THE DRAWINGS

Example embodiments of the disclosure will now be described by way of example only and with reference to the accompanying drawings, in which.

DETAILED DESCRIPTION

The examples, materials and methods of described herein provide, inter alia, Z-grade materials, shielding components or systems, and processes of making the same. These and other aspects, features and advantages of the disclosure or of certain embodiments of the disclosure will be further understood by those skilled in the art from the following description of example embodiments. In the following description of various examples, reference is made to the accompanying drawings, which form a part hereof. It is to be understood that other modifications may be made from the specifically described methods and systems without departing from the scope of the present disclosure.

It is also to be understood that the specific material, systems, devices and processes illustrated in the attached drawings, and/or described in the following specification, are simply exemplary embodiments. Hence, specific dimensions and other physical characteristics relating to the embodiments disclosed herein are not to be considered as limiting. Moreover, the figures of this disclosure may represent the scale and/or dimensions according to one or more embodiments, and as such contribute to the teaching of such dimensional scaling. However, the disclosure herein is not limited to the scales, dimensions, proportions, and/or orientations shown in the figures.

Figure 1:
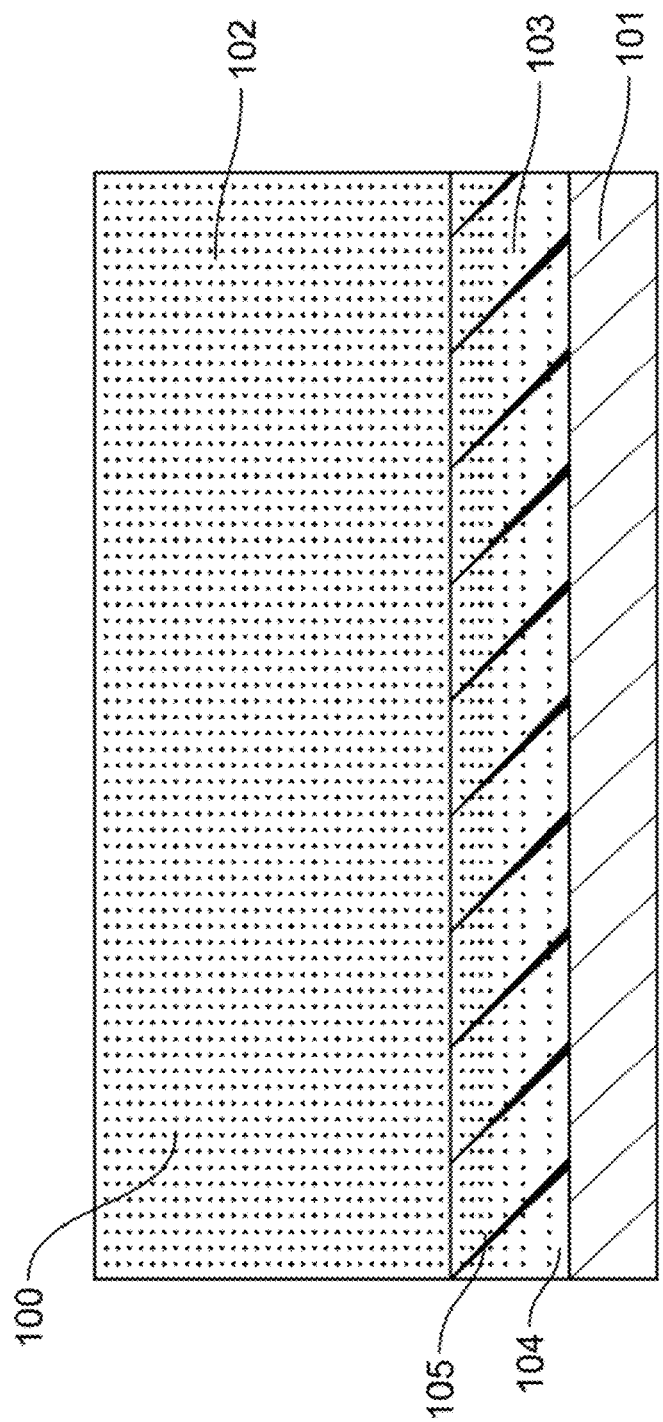
FIG. 1 is a schematic illustration of an example Z-grade material.

In some aspects, this disclosure relates to improved Z-grade materials such as a Z-grade alloy material. FIG. 1 shows an example schematic view of a Z-grade material including a high atomic number material 101, a low atomic number material 102, where the atomic number of the low atomic number material is lower than the atomic number of the high atomic number material (in some examples, if alloys or other combinations are used for either material, any atomic numbers of the low atomic number material are lower than any atomic numbers of the higher atomic number material). The low atomic number material may be bonded to the high atomic number material. The Z-grade material in this example also includes a diffusion zone 103, the diffusion zone including a mixed metallic alloy material, the alloy material including both the high atomic number material and the lower atomic number material. In some examples, the diffusion zone includes a gradient of materials. For example, the example schematic of FIG. 1 shows a region with a relatively higher concentration of the high atomic number material 104, and a region with a relatively higher concentration of the low atomic number material 105. In some examples, the composition of the diffusion zone may be relatively uniform, however.

In some examples, the diffusion zone of the Z-grade material is at least 0.5 mil in thickness, at least 1 mil, at least 2.5 mil, at least 4 mil, at least 5 mil, or at least 7.5 mil, while in others it is at least 10 mil in thickness, 25 mil, at least 40 mil, and in others at least 50 mil or 75 mil thickness. In some examples, it is 1-2.5, 1-5, 1-10, 5-10, 10-50 or 10-20 mil in thickness. In certain examples, the thickness of the diffusion zone equal to at least 10% of a thickness of the thinner of the high atomic number material and the low atomic number material (or both, if they have equal or essentially equal thickness). In other examples, it is essentially equal to the thinner of the two. In still other examples, the diffusion zone is actually thicker than the thinner of the two. As one example, a titanium layer may be approximately 100 mil, a tantalum layer approximately 8-10 mil, and the diffusion zone between the two is approximately 10 mil. In some examples, any of the layers may be between 1-500 mil, such as 1-100, 10-100, 1-10, 1-5, 5-10, 1-25, 5-25, or 50-100 mil.

The Z-grade material may have an overall thickness suitable for its particular application, expected radiation levels, and/or applicable volume constraints. In some examples, the overall Z-grade material is at least 100 mil thick, in others at least 200, and in others at least 300. In other examples, the material provides the desired shielding characteristics while remaining under 400 mil, or under 300 mil, under 250 mil, under 200 mil, or under 150 mil. In comparison an aluminum (Al) shielding at 3.0 g/cm$^2$ has a thickness of 434 mils and a titanium (Ti6-4) shielding at 3.0 g/cm$^2$ has a thickness of 267 mils.

In some embodiments, the high atomic number material comprises one or more of tantalum, tungsten, or a copper-tungsten alloy. In certain examples, the low atomic number material comprises one or more of aluminum, titanium and vanadium. In various examples, aluminum and/or titanium materials are used to form an alloy with tantalum. Suitable example materials include Al 6061 or Ti6-4. In some examples, the Z-grade material also includes an aluminum layer bonded the Z-grade material (e.g. bonded to the low atomic number material, such as being bonded to titanium after a titanium/tantalum Z-grade material is formed). The optional addition of aluminum by diffusion bonding with titanium or brazing enables another lower atomic number material to be added. This may be advantageous for fast electron shielding where the Bremstrahlung critical energy can be increased, so as to reduce Bremstrahlung formation, when comparing aluminum to titanium. Titanium may also be used as an adhesive interlayer between aluminum and tantalum (or other high/low atomic number materials).

In certain examples, the density of the diffusion zone is between or varies between around 4.4 g/cm$^3$ and about 16.7 g/cm$^3$ along the gradient. In some examples, the diffusion zone is a graded metallic alloy. In some examples, the density is at least 4.0 g/cm$^3$ and up, 6.0 g/cm$^3$ and up, 8.0 g/cm$^3$ and up, 10.0 g/cm$^3$ and up, or 12.0 g/cm$^3$ and up. In various examples, the areal density of the entire Z-grade material is between 1.5 and 2.25 g/cm$^2$ or between 2.5 and 3.0 g/cm$^2$, or between 2.9 and 3.1 g/cm$^2$. In some examples, it is 2.0 g/cm$^2$, 2.25 g/cm$^2$, 2.5 g/cm$^2$, 2.75 g/cm$^2$, 2.9 g/cm$^2$, 3.0 g/cm$^2$, or 3.1 g/cm$^2$ or above, while in others it is between 1.6 and 1.7 g/cm$^2$, and other between 1.5 and 2.0 g/cm$^2$.

The Z-grade materials may provide an integrated, single piece of shielding as opposed to prior systems using, e.g., additional spot shield of the second high atomic number material. This may be particularly useful for small satellites, or small instruments housing applications where shielding is needed in one or more areas, or to enclose an entire device/satellite/instrument/etc., but where there are volume constraints affecting the amount and type of shielding that may be utilized. By reducing shielding thickness through use of a high atomic number material (and optionally, as described herein, by making the low atomic number material denser via elevated temperature processes) the Z-grade materials may help enable shielding of small structures with less volume impact, when compared to typical aluminum shielding. Indeed, for one application example, the significant reduction in spacecraft volume will benefit from one piece Z-grade shields, as larger thickness aluminum shields would prohibit the incorporation of standard electronic cards in an enclosure, due to volume constraints.

The Z-grade materials may have high densities for each material layer (as compared to layers obtained through prior formation methods), be flat and thus easy to incorporate into various systems, and have a strong weld or interface between layers.

Figure 13A:
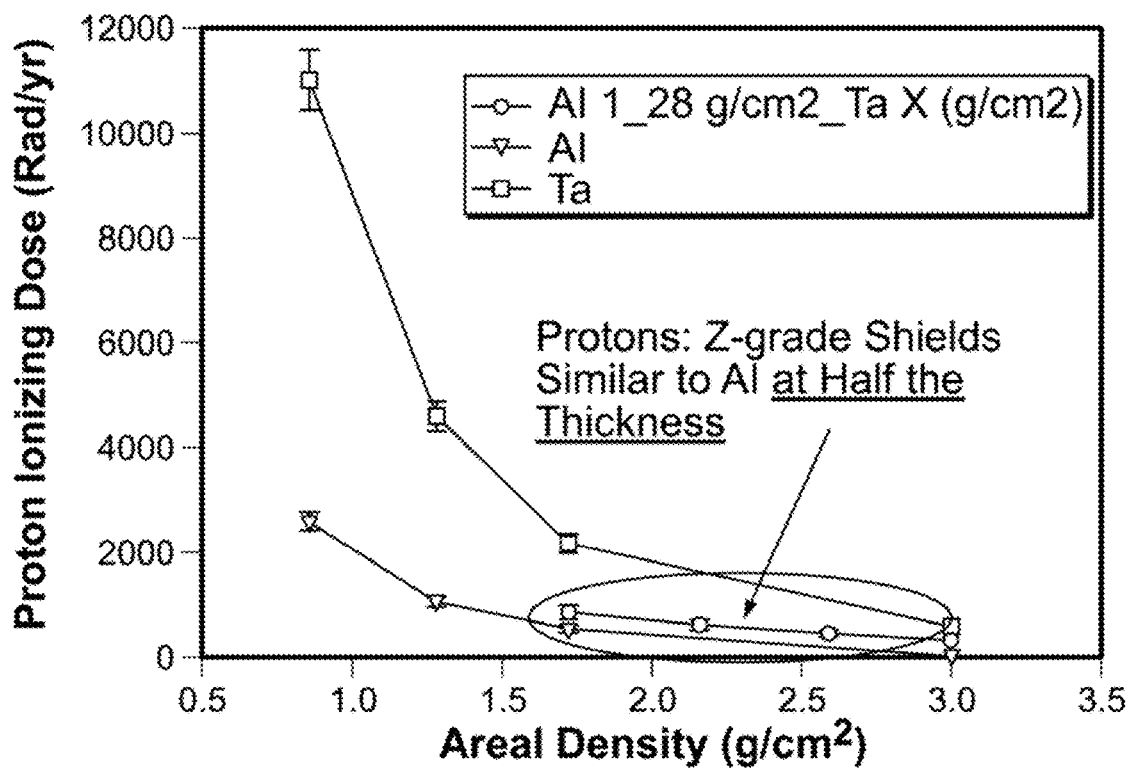
FIGS. 13A and 13B show graphs of ionizing doses as a function of areal density for Al, Ta, and Al/Ta samples.
Figure 13B:
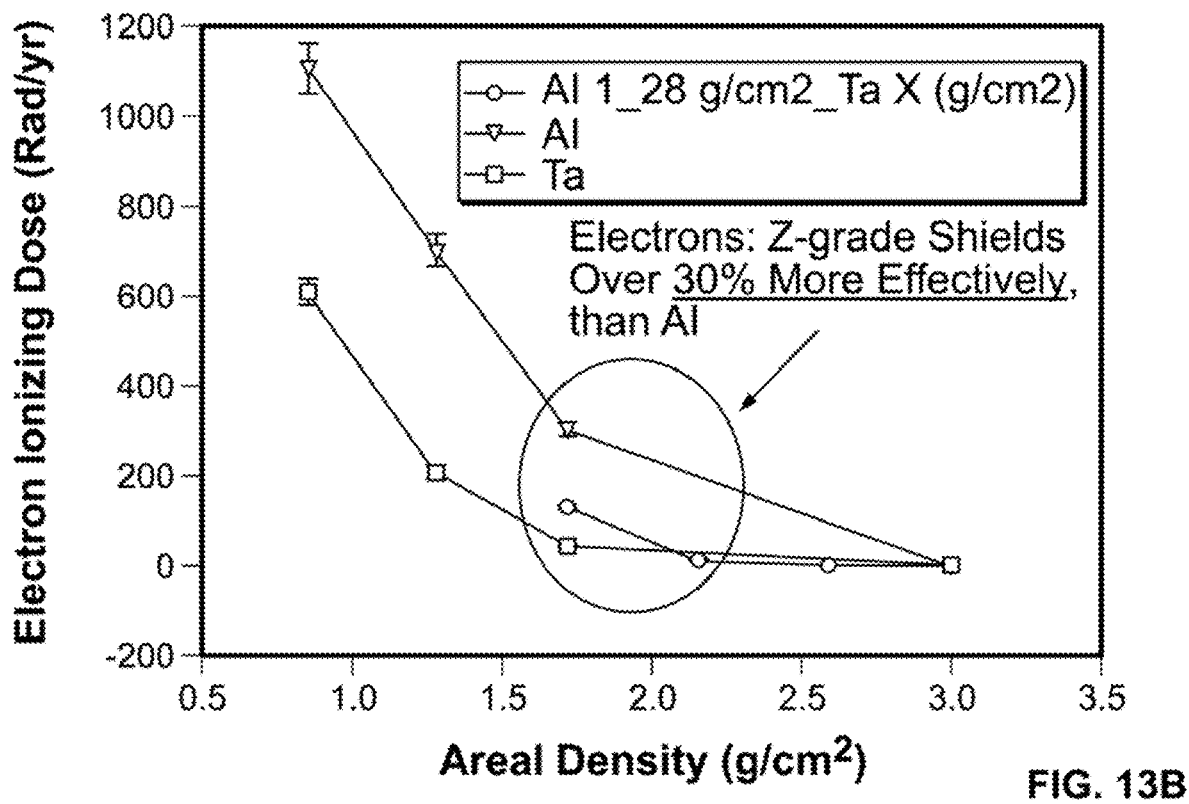

In some examples, a Z-grade material (such as one with Al/Ta or Ti/Ta, i.e. an aluminum/tantalum or titanium/tantalum material) a can reduce the overall thickness in half compared to standard (e.g. aluminum only) shielding but providing same areal density. As illustrated in FIG. 13, the electron shielding of an example Z-grade material is modeled having 30% greater shielding effectiveness and about the same proton shielding effectiveness compared to an aluminum shield. Specifically, the Z-shield properties have been estimated, using The Space Environment Information System (SPENVIS) radiation shielding computational modeling, to have ~30% increased shielding effectiveness of electrons, at half the thickness of a corresponding single layer of aluminum.

The diffusion zone may enable a shielding property between that of a high Z material and a low Z material, without having to add another material layer. This can not only provide additional shielding benefits, but can help lower thickness and volume.

Example Material Characteristics

The remaining Figures of the application illustrate example properties that the Z-grade material and/or its constituent materials may provide.

Figure 2:
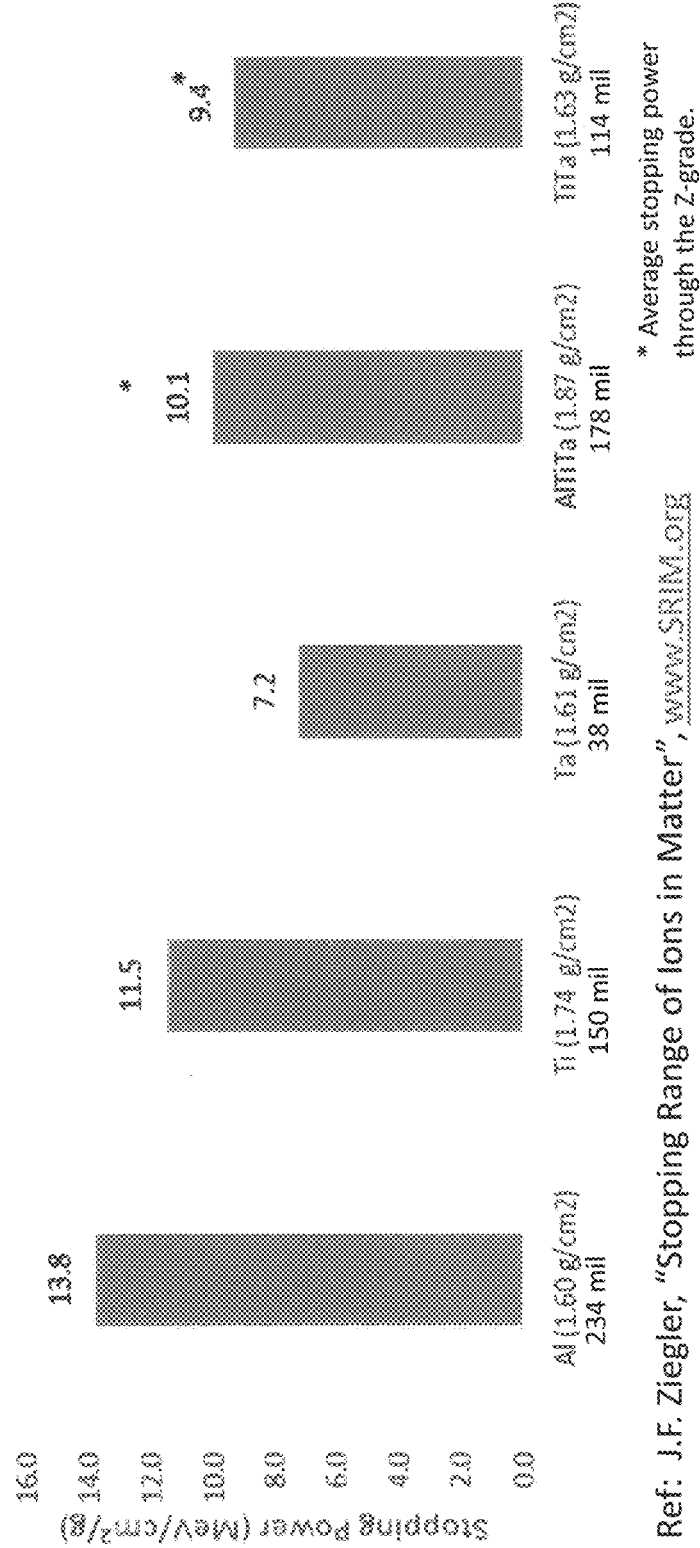
FIG. 2 is a graph illustrating the stopping power of Z-grade with varying materials, and the material densities.

FIG. 2 is a graph illustrating the stopping power of Z-grade by modeling the energy loss of a 49.3 MeV proton beam, with varying materials having varying densities and thicknesses, and illustrating how the Z-grade materials may provide essentially equivalent shielding in conjunction with thinner materials.

Figure 3:
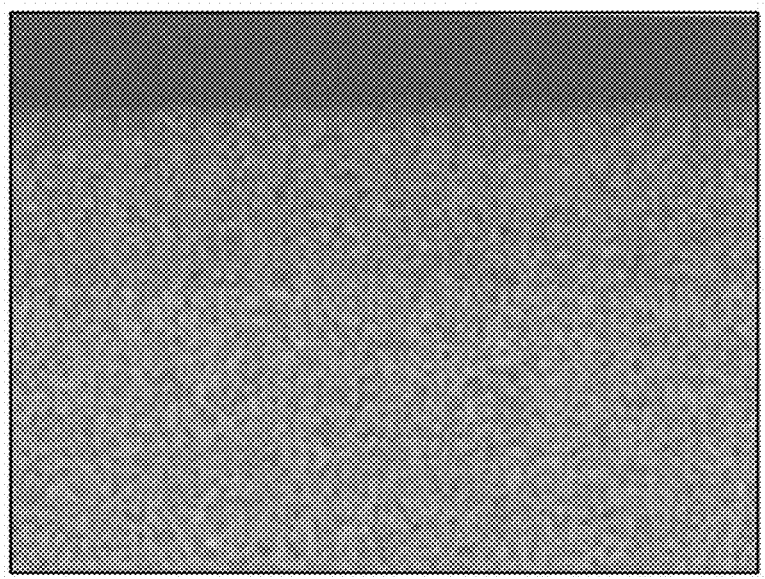
FIGS. 3-5 are EDAX images of titanium, vanadium, and tantalum in a Z-grade material.
Figure 4:
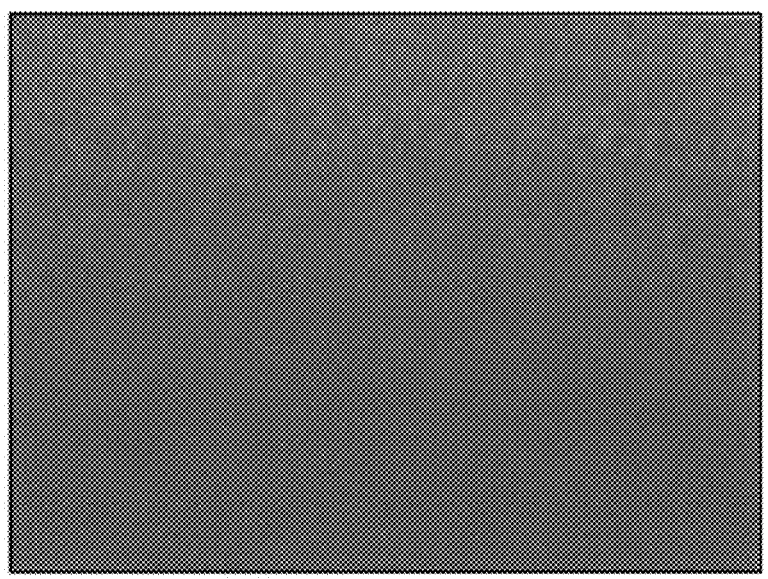
Figure 5:
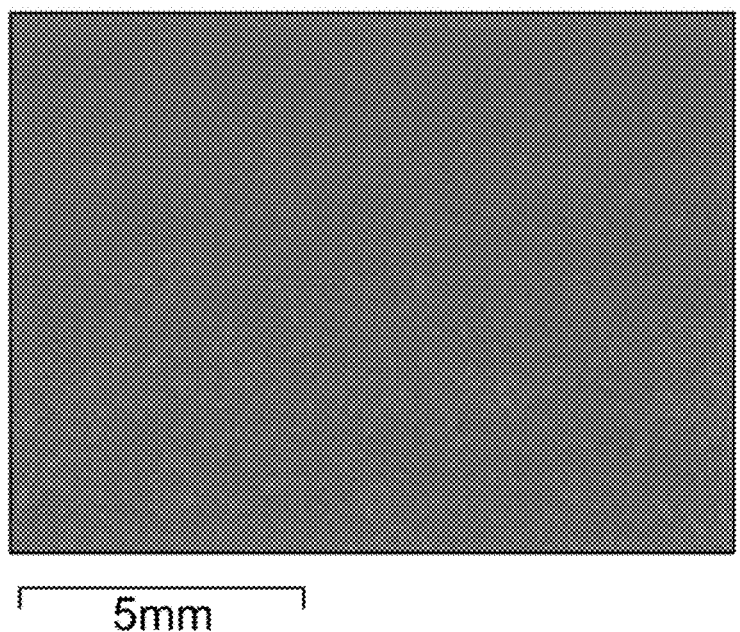

FIGS. 3-5 are EDAX images showing diffusion of titanium and vanadium into tantalum, and illustration a very uniform gradient of the Ti and Ta in the bonding area interface.

Figure 6:
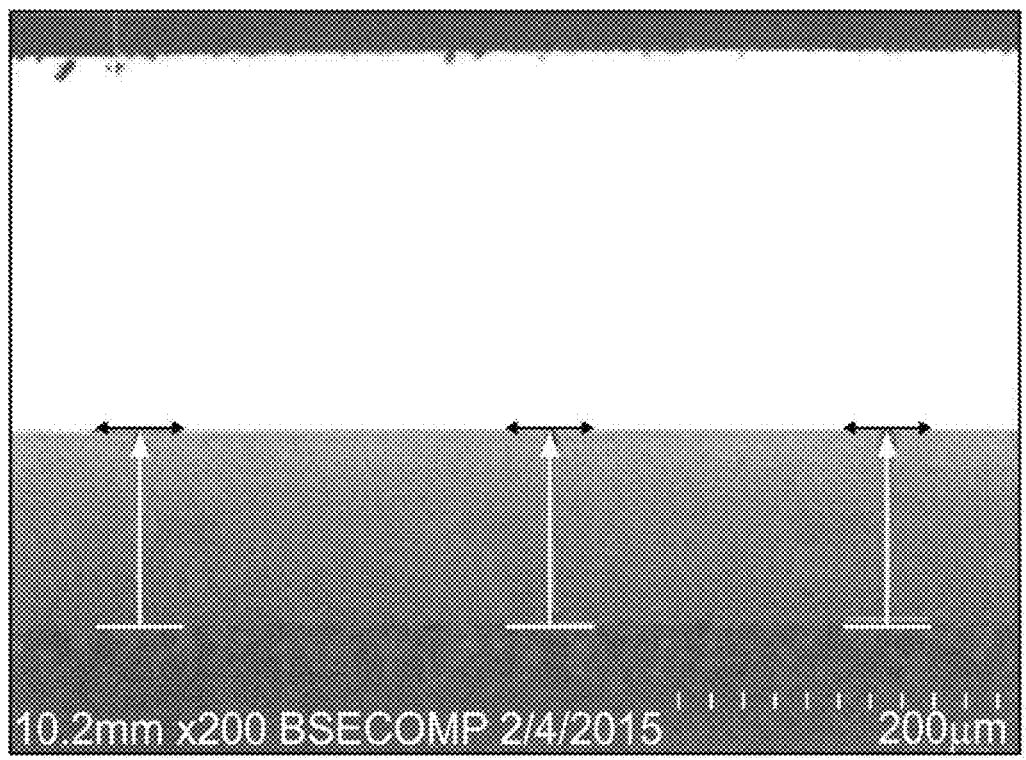
FIG. 6 is a back scattered SEM image of diffusion bond between Ti and Ta.

FIG. 6 is a back scattered SEM image of diffusion bond formed over 256 hours between Ti and Ta.

Figure 7:
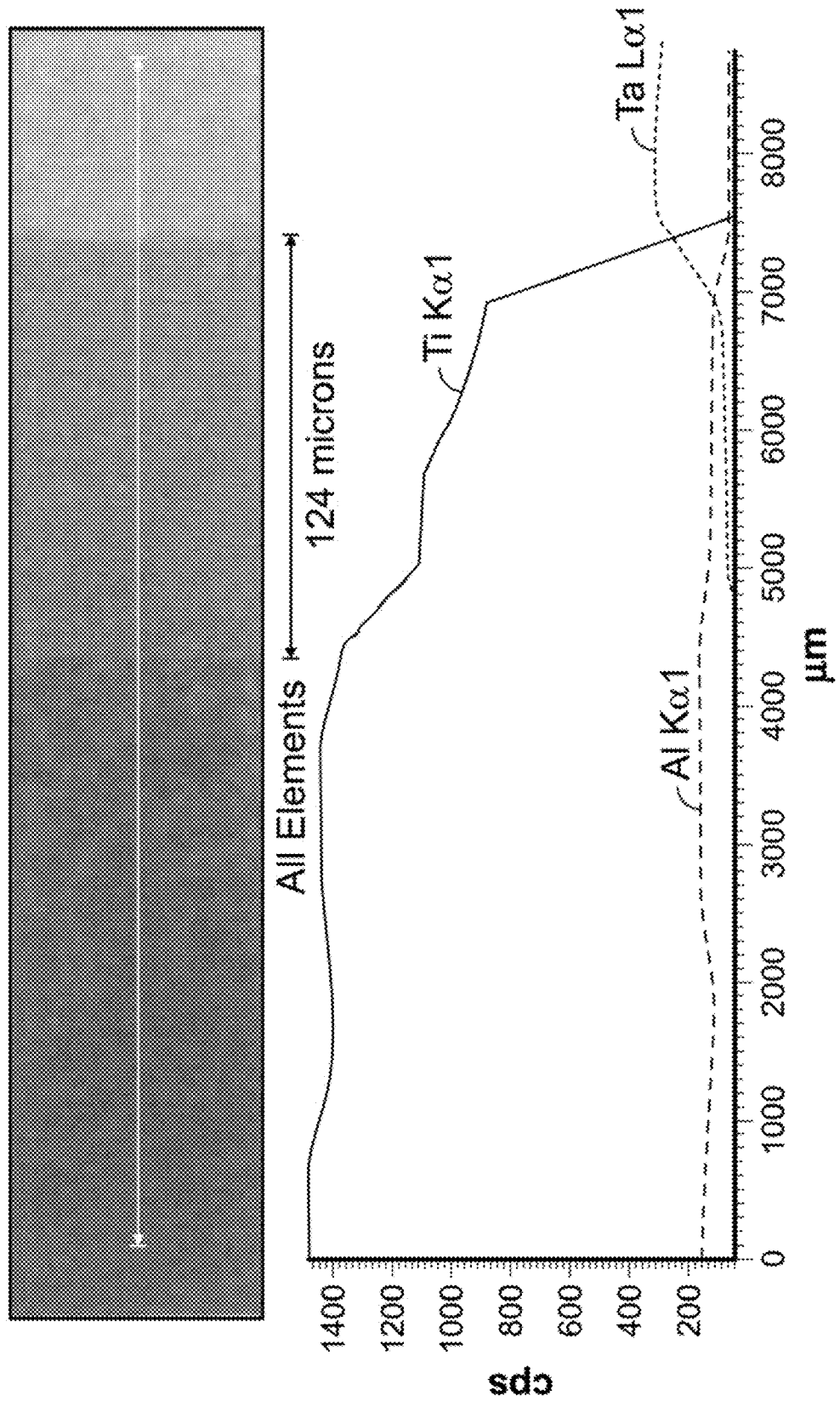
FIG. 7 is an EDAX image and data for the material shown in FIG. 6.

FIG. 7 is a EDAX image and data illustrating a diffusion zone of 124 microns and a higher CPS intensity for the titanium material for the material shown in FIG. 6.

Figure 8:
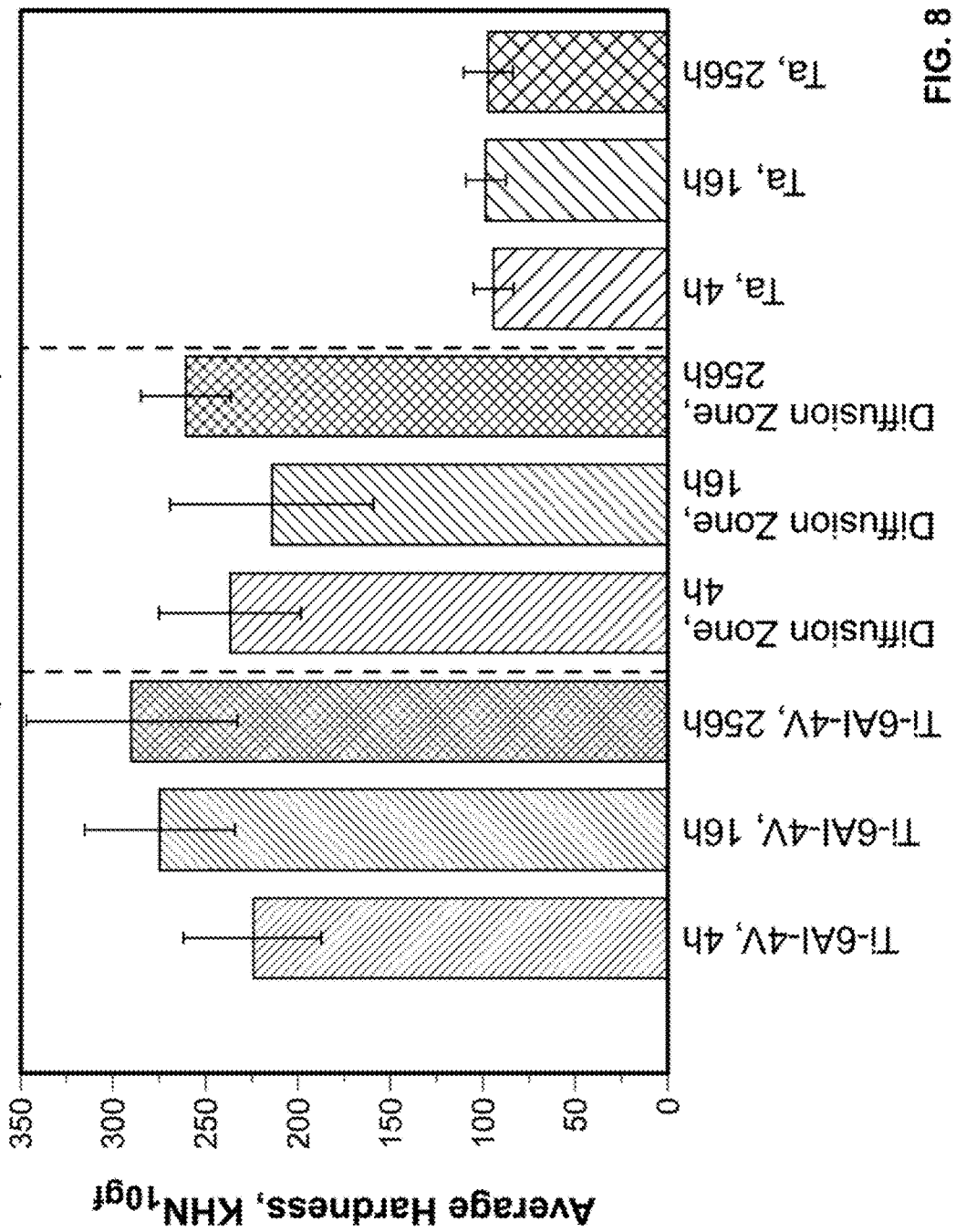
FIG. 8 illustrates the microhardness/Knoop hardness test (KHN) for various layers (Ti, diffusion zone, and Ta) of a Z-grade material after various experimental conditions.

FIG. 8 illustrates the microhardness/Knoop hardness test (KHN) for a various layers (Ti, diffusion zone, and Ta) for 4, 16, and 256 hour diffused Ta—Ti interface, where the diffusion zone was about 130 microns.

Figure 9:
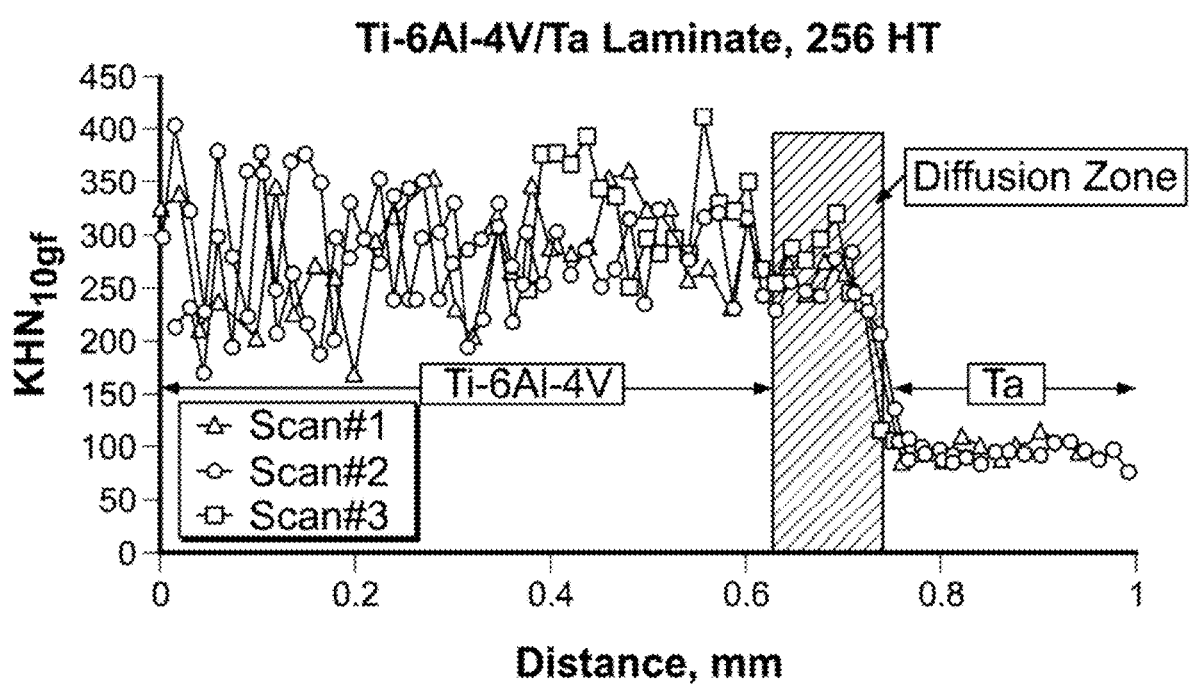
FIG. 9 illustrates the microhardness/Knoop hardness test (KHN) a diffusion zone.

FIG. 9 illustrates the microhardness/Knoop hardness test (KHN) for a 256 hour diffused Ta—Ti interface, where the diffusion zone was about 130 microns.

Figure 10A:
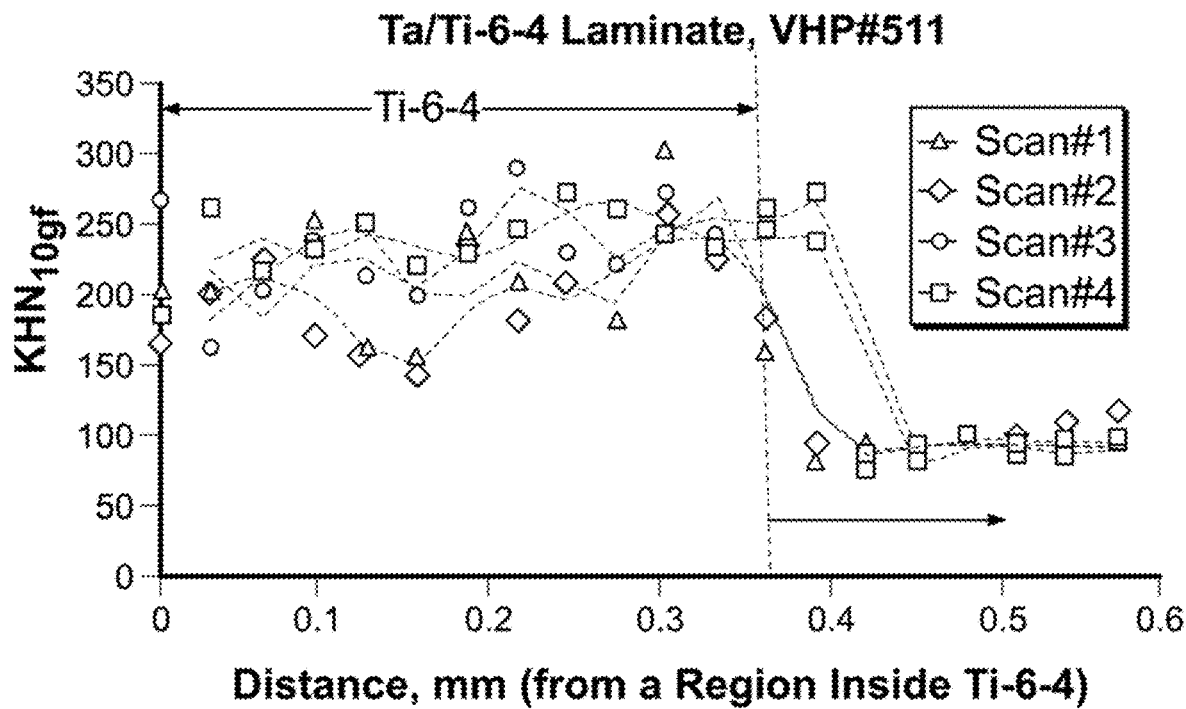
FIGS. 10A and 10B illustrate the microhardness/Knoop hardness test (KHN) for diffusion zones after various experimental conditions.
Figure 10B:
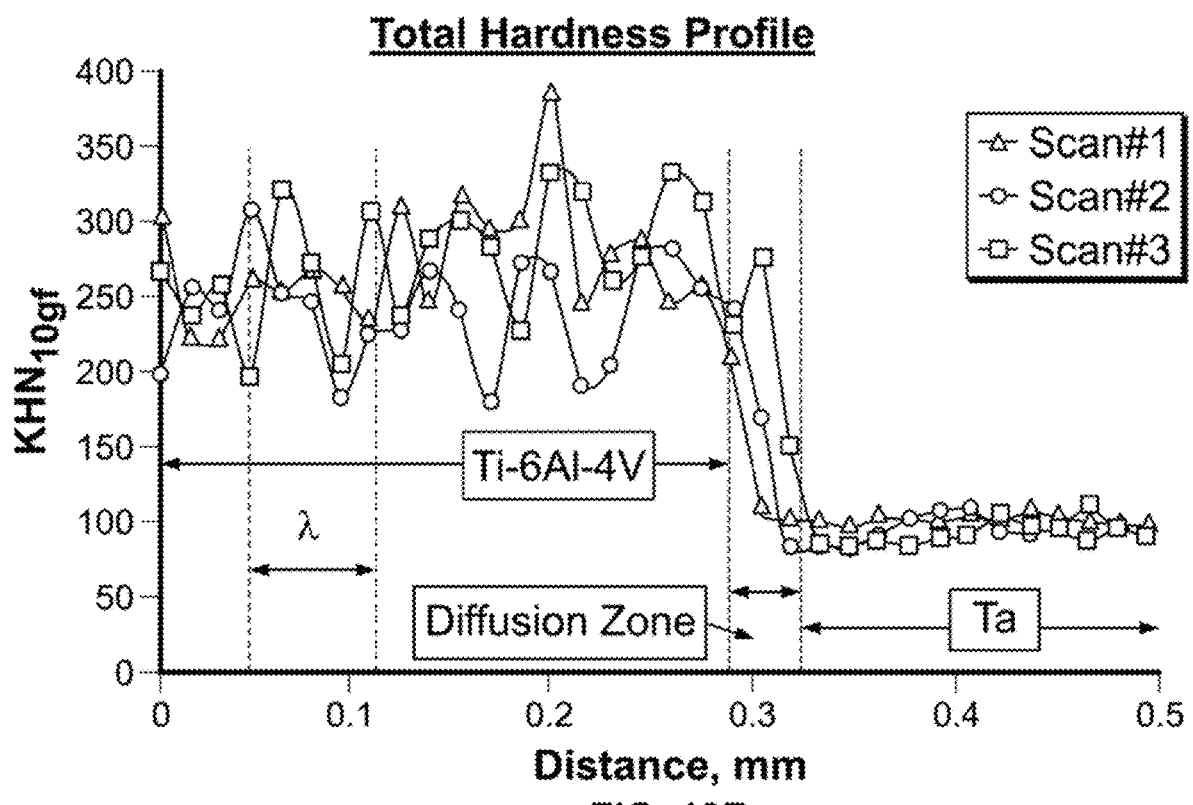

FIGS. 10A and 10B illustrate the microhardness/Knoop hardness test (KHN) for a 4 hour diffused Ta—Ti interface, where the diffusion zone was about 15 microns (FIG. 10A) and a 16 hour diffused Ta—Ti interface, where the diffusion zone was about 30 microns (FIG. 10B).

Figure 11A:
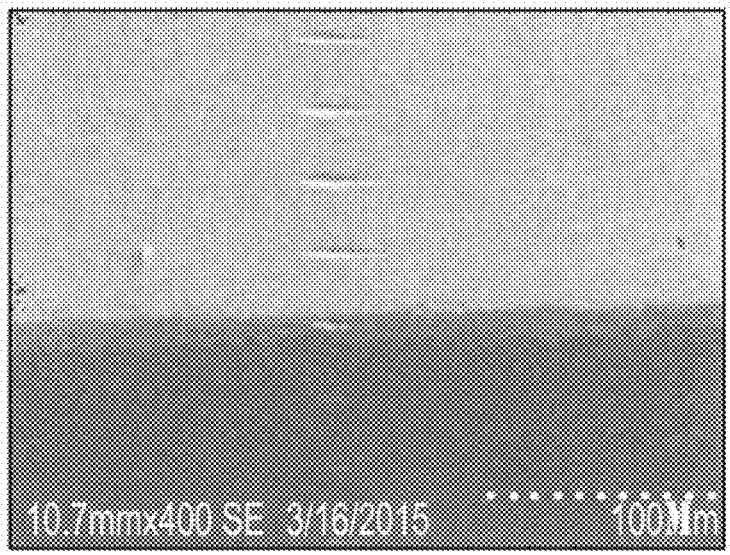
FIGS. 11A-11C are scanning electronic microscope images of Ti—Ta diffusion zones after various experimental conditions.
Figure 11B:
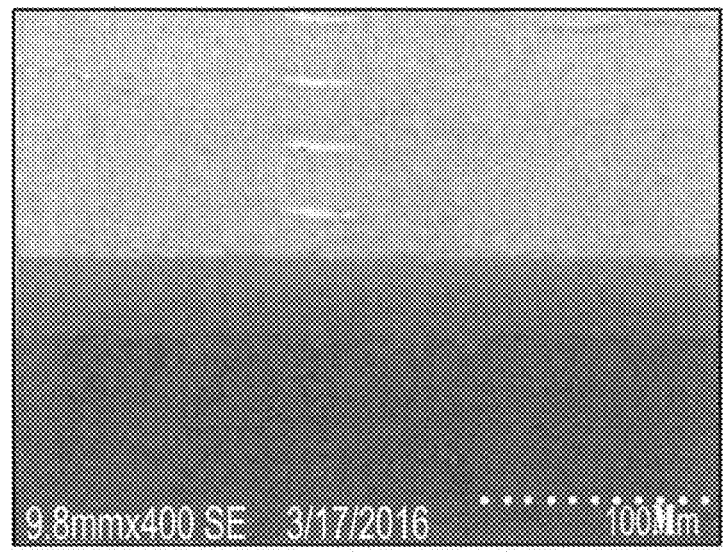
Figure 11C:
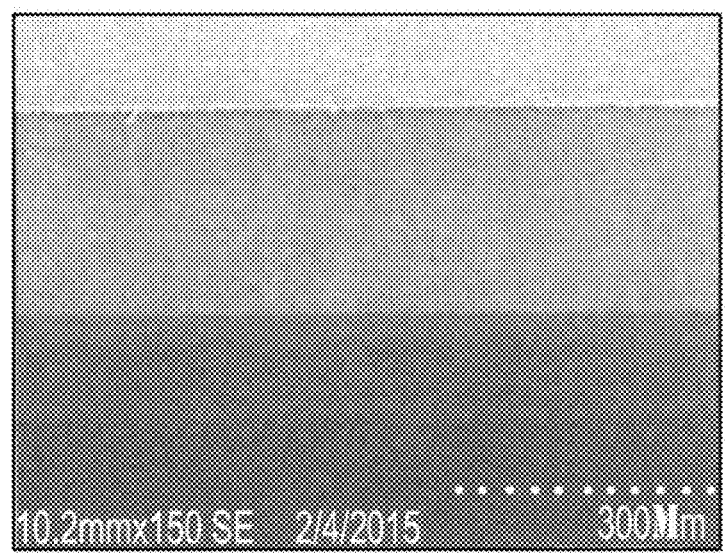

FIGS. 11A-11C are scanning electronic microscope images of a Ti—Ta diffusion zone after 4 hours at 890° C. (FIG. 11A), 16 hours (FIG. 11B) and 256 hours (FIG. 11C) and with 50 mPa of pressure (which is an example possible value but not required). The lightest top layer is Ta, which most dramatically shows diamond scoring marks resulting from additional hardness tests, as it is a softer material. The diffusion zone is in the intermediate medium grey, which clearly increases in size as time increases, and the bottom, dark grey layers in these examples is Ti6-4, which is a harder material and therefore only has smaller scoring marks.

Figure 12A:
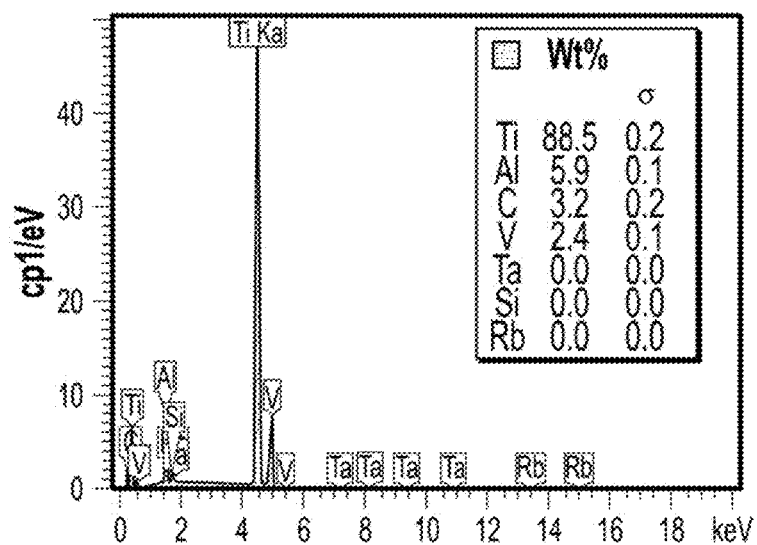
FIGS. 12A-12C are spectra of various areas of a Ti/Ta Z-grade material.
Figure 12B:
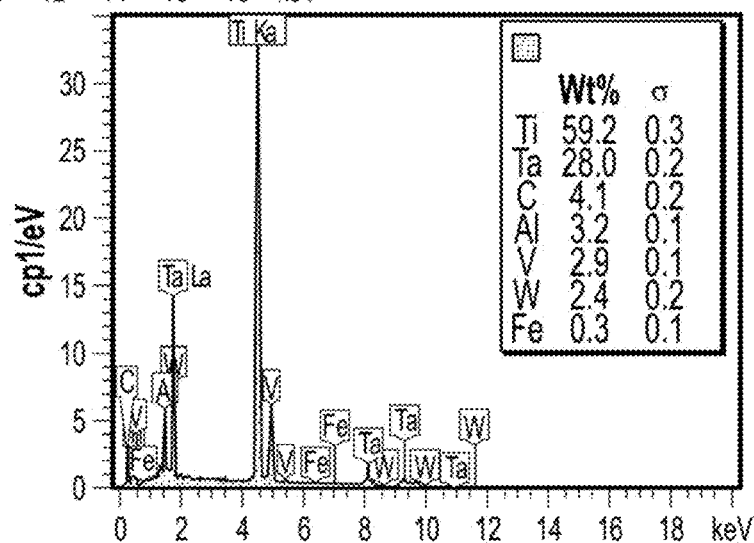
Figure 12C:
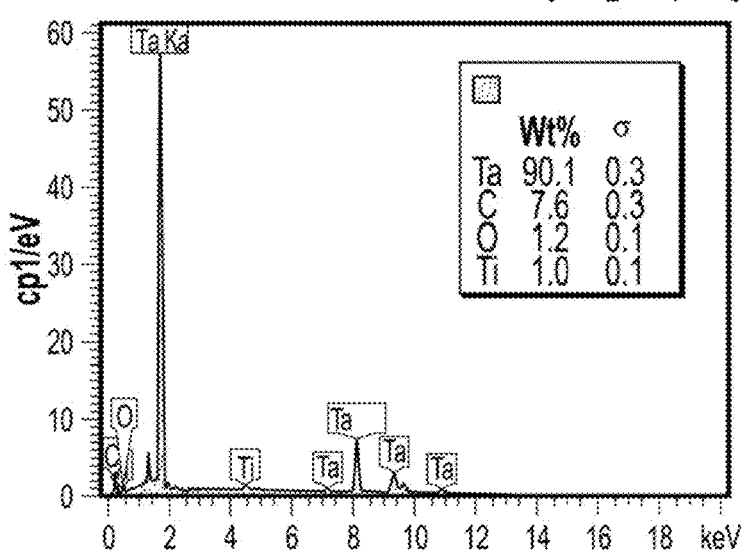

FIGS. 12A-12C are spectra of various areas of a Ti/Ta Z-grade material. FIG. 12A is the Ti layer (Ti6-4) which has around 88.5% Ti, around 5.9% Al, and around 2.4% V (in other examples the V content may be around 4%). FIG. 12B shoes the spectra for the diffusion zone, where the amount of Ti is around 59.2% and the amount of Ta is about 28%, illustrating that Ti may diffuse more readily compared to Ta. FIG. 12C shows the spectra for the Ta layers, which was around 90.1% Ta.

FIG. 13(a.) shows that with expected ionizing dose of 10-400 MeV protons, the Al/Ta has similar shielding performance to Al at approximately half the thickness. In FIG. 13(b.), a expected ionizing dose of 4-6.5 MeV electrons shows greater than 30% improvement in shielding effectiveness for Al/Ta over Al. The predominant radiation dose received behind the shielding samples originated from the proton ionizing dose. In FIG. 13(a.), the dose levels appear below 1 kRad for Al and Al/Ta at areal densities above 1.7 g/cm$^2$, whereas Ta appears higher. In FIG. 13(b.), the electron radiation dose at areal densities above 1.7 g/cm$^2$ appear below 200 Rad for Al/Ta and Ta. At areal densities greater than 2 g/cm$^2$, the electron ionizing dose for the Al/Ta appears to be reduced almost completely. Overall, the expected accumulated total ionizing dose behind 3 g/cm$^2$ shielding will originate from proton radiation.

Figure 14:
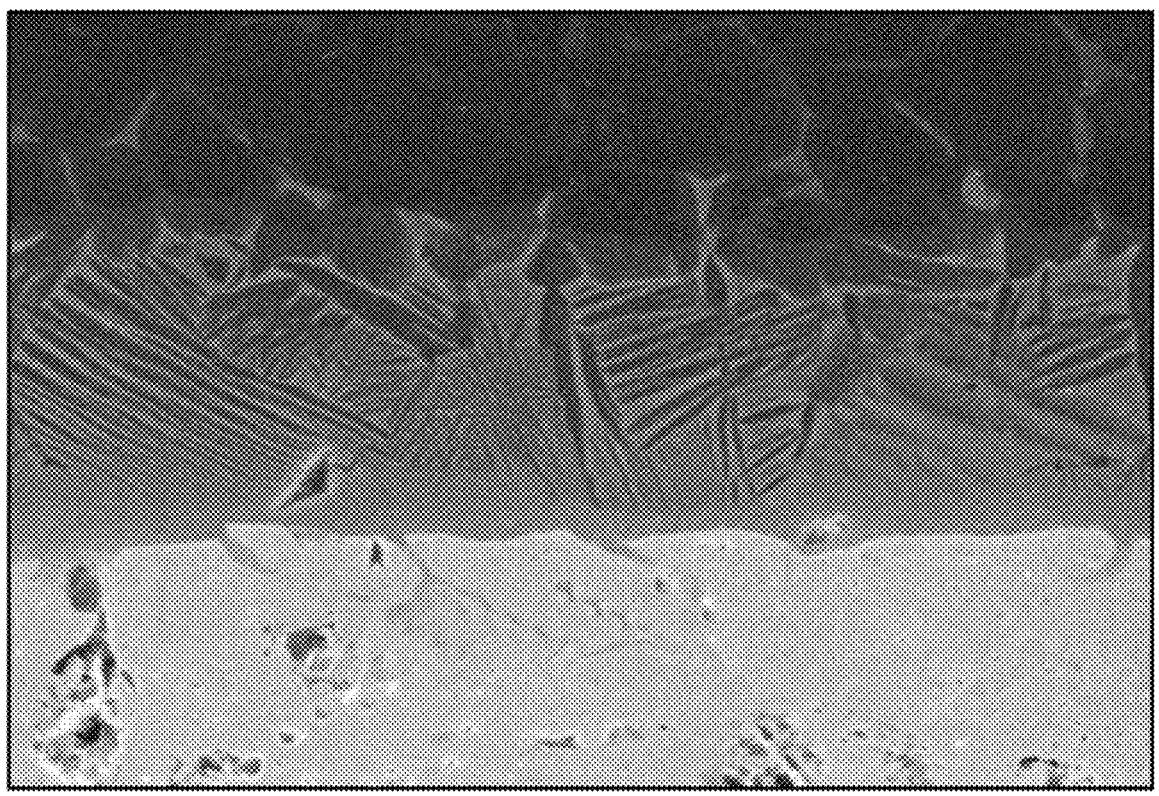
FIG. 14 is an electron image of an example Z-grade material.

FIG. 14 is an electron image of an example Ti64/Ta material, with the Ti material at the top of the image, a diffusion zone in the intermediate part of the image, and the Ta material at the bottom of the image.

Making the Z-Grade Material

In accordance with another aspect, processes are disclosed. These may utilize metallurgy techniques to make one piece radiation shielding with layers of differing atomic numbers. In some examples, the process may include combining a high atomic number material and a low atomic number material, where the atomic number of the low atomic number material is lower than the atomic number of the high atomic number material, and bonding the high atomic number material and the low atomic number together using diffusion bonding to form a Z-grade material. In various examples, the diffusion bonding includes vacuum pressing the high atomic number material and the lower atomic number material at an elevated temperature.

In some examples, the method further includes (in addition to the diffusion bonding) vacuum pressing the Z-grade material at an elevated temperature. In certain examples, the elevated temperature is near a softening or melting point of the low atomic number material. In various embodiments, the process also includes cooling the Z-grade material under vacuum.

For some specific examples, vacuum pressure diffusion bonding is used, where layers of titanium (Ti) and tantalum (Ta) are bonded at elevated temperatures underneath the melt temperature of the Ti6-4 titanium material. As another example, Aluminum (Al) and a previously formed Ti/Ta material is vacuum pressed diffusion bonded to make Al/Ti/Ta Z-grade. This additional bonding uses welding at a relatively lower temperature under vacuum, under the melt temperature of aluminum. These examples utilize layering and diffusion bonding.

For another specific example, a diffusion gradient Z-grade may be formed with titanium/tantalum. A Ti6-4/Ta sample may be produced via diffusion bonding at elevated temperature for extended time periods to allow a large diffusion zone between titanium and tantalum to take place. This improves the gradient of the Z-grade by having a greater distribution of titanium and tantalum in the diffusion zone (again, different suitable materials and metal or metallic alloys may be used in this and all other examples specifically identifying a material, and the elevated temperatures may be adjusted accordingly relative to the different melt temperature). This maximizes the Z-grade of the low atomic number to high atomic number by creating an extended diffusion gradient of the alloys between majority titanium to majority tantalum to form a graded diffusion zone alloy. In some examples, the density gradually increases between the two starting materials.

The diffusion zone can thus be expanded, for example to 5 mils, which is 10 times thicker than typical bonding applications. This additional diffusion zone may create a new shielding layer with an actual atomic number gradient. This can be further exploited to create intermediate densities of graded alloys between a low atomic number and high atomic number material. In turn, this will shield fast electrons and heavy ions, such that the radiation can be even further reduced with a simpler material lay-up while retaining the benefit of thickness reductions. The addition of aluminum on Ti/Ta has substantially improved the atomic number Z-grade with the addition of low atomic number aluminum.

The use of an additional aluminum layer (or simply Z-grade utilizing aluminum) reduces Bremstrahlung radiation in shielding applications for fast electron applications for the Jovian environment where the energy critical point for Bremstrahlung formation, i.e. $E_{collision\ loss} = E_{radiative\ loss}$, is estimated at 51.0 MeV. Therefore the dominant 30 MeV Jovian electrons can be slowed down with reduced Bremstrahlung formation. The critical energy for titanium is estimated at 34.5 MeV. These critical energy calculations are from pg. 41, W. R. Leo, "Techniques for Nuclear and Particle Physics Experiments, 2nd Edition, Spring Verlag, Berlin, 1194, page 378 (which is expressly incorporated by reference). In short, there is a significant reduction in Bremstrahlung formation with the incorporation of Al to Ti/Ta for fast electron shielding applications.

Any important feature of this disclosure is that for Ti/Ta Z-grade materials (and others) these can be manufactured much more simply by using high temperature vacuum press diffusion bonding. In this case there are also radiation shielding benefits available by being able to shape the material using diffusion bonding techniques through use of, e.g. Ti and Ta. For example, one may add separate faces of a cube and/or frame pieces together (or other shapes/components) and under pressure (e.g. by screws) form a shaped structure such as an electronic enclosure to create a seamless joint, as a result of the diffusion bonding, as self-welding that can occur at the joints. For high energy particle radiation shielding, the low atomic number material can be used to shield fast electrons such as the 30 MeV electrons found in the Jovian environment or the earth electron belt. It can also shield high energy protons, such as ones found from solar radiation or the earth inner proton belt with reduced Bremstrahlung formation. In many vault applications or enclosure applications 3 g/cm² aluminum has been used in the past, where this past example is often about 434 mil thick.

A Z-grade with Al/Ta or Ti/Ta can reduce the thickness in half (or even more, as described below, e.g. by around 70% or 80%) with the same areal density. The electron shielding of the Z-grade with 50% thickness reduction is modeled having 30% greater shielding effectiveness and about the same proton shielding effectiveness. Recent shielding modeling (FIG. 2) show that Al/Ti/Ta and Ti/Ta Z-grades had slightly lower stopping powers Al/Ti/Ta (10.1 MeV cm²/g) and Ti/Ta (9.4 MeV cm²/g) compared to baselines Al (13.8 MeV cm²/g) and Ti (11.5 MeV cm²/g). The proton shielding models show that Ti/Ta and Al/Ti/Ta could be used as a substitute for Al shielding applications. The Ti may also add a structural component.

Another advantage of the process is the vacuum pressing at elevated temperature is a relatively cheap technique. The other welding techniques such as ultrasonic and friction stir welding and electron beam freeform fabrication can make the shielding materials additively using powder, wire, foil, and sheet. These other methods take advantage of welding, diffusion bonding methods. The additive approaches also enable making 3D and multilayer constructions.

As mentioned above, another unique feature of this disclosure is the ability to make an extended diffusion zone, which may create a graded alloy between two materials. For example, extending the diffusion times in high vacuum oven at an elevated temperature (e.g. 890° C., but other appropriate temperatures based on the material may be used) may create an extended diffusion zone. These times may be 2 hours or hour, 4 hours or more, 8 hours or more, 12 hours or more, 16 hours or more, 1 day or more, two days or more, 4 days or more, 7 days or more, or 10 days or more. In some examples, 4 hours of diffusion time at 890° C. resulted in a 17 micron diffusion zone. Raising the temperature (such as to 1200 or 1300° C.), can further enhance the diffusion zone extension. For example, raising the temperature from 890° C. to 1200° C. will increase the diffusion rate for the thermal dependence on the Arrhenius equation. It will also increase because titanium will be in the beta phase, a BCC structure. In cases, the diffusivities differ between BCC and HCP between 1 and 2 orders of magnitude.

In some examples, a limiting factor in increasing the area of the diffusion zone is the diffusion coefficient of the tantalum and Ti-6-4 in the alpha phase, hexagonal close pack phase, at 890° C. The diffusion rates of a hexagonal close packed phase can be up to 5 times slower than in a body centered cubic phase. Tantalum is in a body centered cubic phase. Therefore increasing the temperature for the diffusion bonding may increase the inter-diffusion between tantalum and titanium and increase the size of the diffusion zone. If the temperature is raised to 1200-1300° C., for example, the diffusion rate will increase. Other suitable temperatures are around 900, 950, 1000, 1100° C. (or above). The only trade-off is that the titanium will have to go through a phase transition and on cooling the tantalum/titanium layered material may curl or warp slightly. But when this occurs, the material may be flattened, for example at a slightly elevated temperature, as illustrated below. Increasing the temperature and diffusing in the beta phase of titanium will also contribute to conditions for making a larger Z-grade in a shorter amount of time.

By providing an extended diffusion zone, this results in a new shielding approach where the Z-grade occurs with an actual density gradient. Current Z-grade systems are at best systems using multiple and separate layers: such as spacecraft skin, avionics case, and a single layer or two layer spot shield.

For example, in formation of a Ti/Ta Z-grade material using extended diffusion times of 256 hours, this makes a new intermediate density material between Ti6-4 density of about 4.43 g/cm³ and Ta density of about 16.69 g/cm³. This enables a shielding property between that of a high Z material and a low Z material, without having to add another material layer. And the addition of aluminum by diffusion bonding with Ti or brazing enables a yet another lower atomic number material to be added. This is significant for fast electron shielding where the Bremstrahlung critical energy can be increased, so as to reduce Bremstrahlung formation, when comparing Al to Ti.

In these examples, the titanium can also be used as an adhesive interlayer between Al and Ta. This has been demonstrated with an Al/Ti/Ta material sample as described herein. First, a Ti/Ta material is diffusion bonded together using Ti and Ta sheets at elevated temperatures at 850-890° C. (as an example). Then Al can be diffusion bonded to the Ti sheet of Ti/Ta in order to take advantage of Al being able to bond with Ti at a lower temperature, underneath the melting point of Ti. Therefore, low atomic number materials such as Al or alloys of Al can be adhesively bonded with Ti or similar reactive materials of higher melting point with tantalum or other refractory materials such as tungsten or tungsten alloys, such as tungsten copper. The benefits of these Z-grade shielding arc for applications with small satellites or instrument enclosures where volume reduction is important and the need to effectively shielding high energy particles necessitates a layered approach for volume and shielding effectiveness.

In some embodiments, the diffusion bonding includes thermal spaying, such as plasma spraying, the low atomic number material onto a sheet of the higher atomic number material. The thermal spraying may include plasma spraying or RF plasma spraying. RF plasma spraying titanium or aluminum onto a tantalum sheet has a high chance of welding at the interface. Both titanium and aluminum are known to alloy with tantalum once the aluminum or titanium is added to the tantalum. The titanium or aluminum layered tantalum can then be vacuum hot pressed near the softening points of the low atomic numbered materials, e.g. the aluminum or titanium, to increase the density of the low atomic number material on top of the tantalum sheet. Al 6061 or Ti6-4 plasma spray powder may be used to take advantage of its alloy property.

In certain examples, the diffusion bonding includes welding the low atomic number material onto a sheet of the higher atomic number material using an electronic beam gun. This may utilize a wide feed (e.g. a dual wire feed) and the electron beam gun to depositing the material. For example, the process may use Electron Beam Freeform Fabrication (EBF3) aluminum or titanium wire layered onto tantalum material (e.g. a sheet). This process would take advantage of the welding technology of the EBF3. The EBF3 method allows another way of adding a dense layer of low atomic number material or alloy onto the higher atomic number material, such as tantalum or tungsten, which are refractory metals and hard to melt. After the process is done, the layered sheet material may have warped in shape due to the thermal stresses of the welded EBF3 material. This bilayer material can then be added to a vacuum hot press just below the melt temperature of the aluminum or titanium to soften and cool in the vacuum press to remove the warp. Again, Al 6061 or Ti6-4 may be used to take advantage of its alloy property.

In various embodiments, the diffusion bonding includes heating the low atomic number material under an inert atmosphere or a vacuum to its melting temperature, and coating a sheet of the high atomic number material with the melted low atomic number material. As an example, the bonding may include casting Al or Ti on top of tantalum or tungsten or CuW sheet. This process may be by accomplished by heating Al or Ti or alloys thereof under an inert atmosphere or in vacuum to the melting temperature. The molten Al or Ti would then coat over the tantalum or tungsten material (e.g. a sheet). Al and Ti can form alloys with tantalum and thus make a strong interface with these materials (e.g. a sheet of the material). On cooling, if the tantalum or tungsten sheet warps due to thermal stress, then the resulting Al or Ti coated tantalum or tungsten sheet can be placed into a vacuum hot press and heated until Al or Ti softens, just below the melt temperature, such that the pressure straightens the bilayer sheet. Then it is cooled while under pressure to retain the flatness.

In some examples, the diffusion bonding includes ultrasonic layering of the low atomic number material onto the high atomic number material. For example, the bonding may include ultrasonic layering of (a) Aluminum or Titanium foil onto tantalum or tungsten or CuW sheet, (b) tantalum or tungsten or CuW foil onto aluminum or titanium sheet, (c) tantalum or tungsten foil onto aluminum or titanium foil, or (d) aluminum or titanium foil onto tantalum or tungsten foil. A forged or high density layer may be formed. In some examples, a larger area is made, e.g. at least 10 v. 10 cm, or having at least 100 cubic centimeters in area (but larger or smaller squares, rectangles, or other geometric or none geometric shapes are suitable for the Z-grade materials (made via this example process or others), such areas as 200 cubic centimeters or more, 500 or more, 1000 or more, and so on). In some examples, the layers are flat, so the layered materials may be placed in a vacuum hot press to just below the melt temperature of the low atomic number material, such as aluminum or titanium. This may provide a strong interface (good weld), a flat large area sheet, and high densities for each elemental material or alloy. In this manner, however the initial Z-grade material is made (e.g. ultrasonic v. plasma spraying or others), additional desirable characteristics may be obtained.

In various examples of the process, the high atomic number material includes one or more of tantalum, tungsten, or a copper-tungsten alloy, and the low atomic number material comprises one or more of aluminum or titanium. In certain examples, the formed Z-grade material includes a diffusion zone, where the diffusion zone includes a mixed metallic alloy material, the alloy material including both the high atomic number material and the lower atomic number material.

Example Applications and Systems

The applications of the Z-grade material are numerous, but these improved materials may be particular advantages for satellites or other space applications such as shuttles. For example, a research payload could be made with the Z-graded radiation shields of varying thicknesses. As another example, an engineered Z-grade radiation shielding vault may protect a system's electronic boards. Other housings, encloses, surfaces, or spot shields may be made. In some examples, one or more surfaces and/or other pieces of Z-grade material may be fastened, attached, bonded or joined to each other, a frame pieces or entire frame, or another object to form a partial or full enclosure. In other examples, there may be a skin or surface on the exterior of a satellite or shuttle comprising the Z-grade material, or a housing enclosing one or more parts or components, that comprise the Z-grade material in the entire housing or in one or more sections of the housing. The improves processes described herein enable cost effective shielding for small satellite systems, with significant volume constraints, while increasing the operational lifetime of ionizing radiation sensitive components. This in turn may provide for increased mission lifetimes, and enable, for example, out of low earth orbit (LEO) missions.

For example, the Al/Ta Z-grade material may offer a thickness reduction approaching half of a typical 3 g/cm$^2$ (1.1 cm) Al shield. With materials dimensions of approximately 10 cm×10 cm×10 cm (1000 cm$^3$) the loss of electronics card volume area and cable volume would be 295 cm$^3$ or—30% of the volume. A shielding thickness of a 0.5 cm Z-grade would only have a volume reduction of—14%. At the same time, the Z-grade material performs similar to Al for the proton environment and over 30% more effective at areal densities of 1.7 to 2.2 g/cm$^2$ for an electron environment. The addition of Z-grade shielding thus can offer the reduction of total ionizing dose on sensitive electronic components, such as memory cards and CMOS devices. The near complete elimination of electron radiation at areal densities greater than 2 g/cm$^2$ reduces the chance of internal charging effects on electronic that causes anomalies. The use of the Z-grade radiation shielding enables shielding applications in volume constrained small satellites and instrument enclosures, where typical aluminum shielding is volume prohibitive.

As another example, a Ti/Ta Z-grade material may offer a thickness reduction compared to known shielding materials (e.g. the standard 434 mil Al shield) of up to about 70% of a typical 3 g/cm² (1.1 cm) Al shield, or even about 80%. In some embodiments, a Ti/Ta material has an overall thickness of about 140 mils (i.e. about 0.36 cm) and an areal density of 3.0 c/cm², where the Ti layer is about 105 mils (i.e. about 0.27 cm) and the Ta layer is about 40 mils (i.e. about 0.09 cm). For an example incorporating the additional Al layer, a Z-grade material with (at least) the desired areal density has an Al layers of 0.23 cm, a Ti layers of 0.16 cm and a Ta layer of 0.09 (i.e. about 90 mils, about 63 mils, and about 40 mils).

In some examples, a relatively thin Ti (or other low atomic number materiel) layer is used, diffusion bonded to a high atomic number material, and then an additional Al layer is brazed on (e.g. after the materials are cleaned). The diffusion zone may relatively extended to make the e.g. Ti layer even thinner by extending the gradient and lengthening the diffusion zone incorporating the high atomic number material. As another example, the diffusion conditions may be such that the large amounts (e.g. 50% or more, 70% or more, or 90% or more) or even essentially the entire high atomic number material diffuses into the lower atomic number material, providing increased density while lowering overall thickness.

For these relatively thin materials (e.g. having a total thickness of about 190 mils or less, 160 mils or less, 150 mils or less, 140 mils or less, 125 mils or less, 110 mils or less, 100 mils or less, 95 mils or less or 90 mils or less), that still provide an areal density sufficient for shielding (e.g. around 3.0 or at least 3.0) one of more sheets of the materials may be connected to form a vault or housing (e.g. to define a square or rectangular area, or any other shape as needed for a particular electric component or other object that requires shielding). Where high degrees of thinness is needed, the amount of Tantalum (or other high atomic number material) may be increased and formed into an alloy with a low atomic number material (e.g. Titanium) to form a thin but dense layer. While this may not be as strong structurally as other examples, another layer of e.g. Ti (or another low atomic number material) may be added and more briefly diffused in to help the mechanical properties of the material. For example, an initial Ti layer with a 10-20 mils diffusion interface, where Ta is diffused all the way through the interface to form an alloy, and then another Ti layer is added but diffused less (e.g. so the additional interface is less) to provide structural support. Thus, the low atomic number material (or different low atomic number materials) may be diffusion bonded twice, once to form an alloy, and the second time primarily for structural reinforcement.

As further illustrative embodiments, one example material is 145 mil (0.363 cm) thick, with Ti (105 mil)/Ta (40 mil). Another material (e.g. for use in a shield or vault or housing) is 125 mil (0.317 cm) thick, with 50 mil Ta (2.15 g/cm²)/35 mil Ti (0.393 g/cm²) that are initially diffusion bonded over extended periods of time, and then another Titanium layer that is diffusion bonded to the Ti/Ta alloy, that is 40 mil (0.461 g/cm²). The additional Ti has greater strength than the Ti in the extended diffusion bonded layer. The densities of these materials are Ti-6-4=4.43 g/cm³, Ta=16.68 g/cm³. As yet another example, a material (e.g. shield material) is 97 mil (0.248 cm) thick, with 60 mil Ta (2.58 g/cm²)/37 mil Ti (0.42 g/cm²). This is a Ti/diffusion gradient alloy/Ta Z-grade created by diffusion bonding over extended periods of time. The densities of these materials are Ti-6-4=4.43 g/cm³, Ta=16.68 g/cm³.

As yet another example, a Al/Ti/Ta material may have dimensions of about 190 mil (0.483 cm) and an areal density of 3.0 g/cm²' In this examples, the Al material is about 89 mils (~0.226 cm/0.610 g/cm²), the Ti material is about 63 mils (~0.160 cm/0.71 g/cm²) and about 40 mil Ta (~0.102 cm/1.72 g/cm²), for total properties of about 0.488 cm thickness/3.04 g/cm². This example may be made by the Ti/Ta diffusion bonding and then brazing Al to Ti.

For another example material, a Al/Ti/Ta material may have a thickness of about 240-250 mil at about 3.0 g/cm², with a very thin Ti layer that acts as interface material for the Al layer (e.g. about 40 mils or less, about 30 mils or less, about 20 mils or less, about 15 mils or less, about 10 mils or less, or about 5 mils or less). Thus, this example is almost only composed of Al and Ta, with only Ti being used as an interface. One may ultrasonic weld the Al to Ta directly and this is preferable to diffusion bonding the Al to Ta, as the Al may melt before diffusion bonding can occur with Ta, which has a very high melting point. Ti working as an interface, however, can more easily allow the creation of materials with the desired characteristics. The use of Ti for diffusion and compatibility with the Al brazing is extremely important at bringing together metals that can't go to high temperatures.

Still other materials may be used for the Z-shielding systems, such a nickel-cobalt alloy, or a nickel-cobalt iron alloy (optionally with small amounts of other materials such as carbon, silicon, and/or Mn). For example, the commercially available Kovar® allow has been used for some single layer shielding applications because it can be used for hermetic sealing of spot shields. This material may also braze to aluminum and diffusion bond with Titanium. As illustrated here, any group IV metal (or metals) with the necessary thermal properties may be used as the low atomic number material or materials as long as other detrimental properties (e.g. poor mechanical characteristics, toxicity, and the like) are present. Other high atomic number materials may also be used, such as Group VI metals (with the same caveats noted about regarding e.g. mechanical properties), such as Tungsten and Tungsten-Copper alloys, or Tantalum alloys such as Ta/W alloys.

To illustrate a vault system and the benefits of the above example materials, a vault may enclose an electronic board. In some examples, the board may have outer dimensions of about 9-10 cm×9-10 cm. Using the example materials above, and assuming board dimensions of 9.0 cm and 9.6 cm, and an outer housing dimension of 9.98 cm, the follow calculations illustrate the benefits of lowering thinness while retaining shielding capability.

First, using the 145 mil Z-grade, a 9.98 cm outer dimension minus the 0.363 cm for the shielding material thickness gives 9.617 cm. Subtracting the 9.6 cm board dimension effectively leaves no additional space, but another surface of shielding material is needed to enclose the board. Thus, using these example dimensions, it is necessary to obtain an additional 0.346 cm of space from reduction of board dimension through shaving off pieces, removing corners, and the like, rather than using the standard size. For the second example material (125 mil), using the 0.319 cm shielding thickness (and using the same calculation), 0.256 cm of additional space is needed. For the third example material (97 mil), using the 0.248 cm shielding thickness, only 0.116 cm of additional space is needed.

By providing increased density, vaults and enclosures can be made for a relatively small investment compared to the high costs for other equipment utilized in typical missions (e.g. system electronics, solar panels, etc.). At the same time, these systems and materials can extend mission lifetimes up to ten years for low earth orbits and eight years for geostationary orbits (compared to typical designed lifespan on the order of months) with typical electronic cards, allowing the systems to forego more expensive radiation tolerant cards. Thus, the systems advantageously allow a reduction in volume while enabling longer duration missions.

These materials, systems and process descriptions are merely examples. In certain embodiments, the materials and systems includes additional combinations and/or substitutions of some or all of the components described above. Moreover, additional and alternative suitable variations, forms and components for the materials and systems will be recognized by those skilled in the art given the benefit of this disclosure. Finally, any of the features discussed in the example embodiments of the processes may be features of embodiments of the materials and/or systems (or components thereof), and vice versa (e.g. any material examples can be used in any system (such as but not limited to vaults, housings, enclosures, and spot shields) and any example materials described in reference to a system may be utilized as a stand-alone material or for other purposes than those discussed in the example system).

We claim:

1. An apparatus comprising a Z-grade material having multiple layers, the Z-grade material comprising:
   a first layer of a first material having a higher atomic number;
   a second layer of a second material having a lower atomic number; and
   a third layer of a third material, wherein the third layer:
      is comprised of an alloy of the first and second materials;
      is positioned between the first and second layers;
      is at least 0.5 mil in thickness; and
      a density of material in the third layer increases along a gradient along a distance between the first layer to the second layer.

2. The apparatus of claim 1, further comprising:
   a fourth layer having a third material that is bonded to the Z-grade material, wherein the third material has an atomic number that is less than the atomic number of the first material.

3. The apparatus of claim 2, further comprising:
   a fifth layer positioned between the first and fourth layers, wherein a density of material in the fifth layer increases along a gradient from the first layer to the fourth layer.

4. The apparatus of claim 3, wherein the third material is the same as the second material.

5. The apparatus of claim 4, wherein the fifth layer is thinner than the third layer.

6. The apparatus of claim 5, wherein the thickness of the third layer is at least 10% of the thinner of the first and second layers.

7. The apparatus of claim 6, wherein the apparatus is in the form of a multi-layered planar sheet of Z-grade material.

8. The apparatus of claim 1, wherein the Z-grade material is a first Z-grade material and the apparatus further comprises a second Z-grade material, wherein the first and the second Z-grade materials are multi-layered sheets of Z-grade material configured to be connected together.

9. The apparatus of claim 7, wherein the thickness of the third layer is at least 10% of the thinner of the first and second layers.

10. The apparatus of claim 9, wherein the third layer is at least as thick as the thinner of the first and second layers.

11. The apparatus of claim 10, wherein the third layer is at least 5 mil in thickness.

12. The apparatus of claim 11, wherein the first material is tantalum and the second material is titanium.

13. An apparatus, comprising:
   a Z-grade material having:
      a first layer of a first material having a higher atomic number;
      a second layer of a second material having a lower atomic number; and
      a third layer, between the first and second layers, consisting of an alloy of the first and second materials, wherein a density of material in the third layer increases along a gradient from the first layer to the second layer, and wherein the third layer is at least 0.5 mil in thickness.

14. The apparatus of claim 13, further comprising:
   a fourth layer of a third material diffusion bonded to the Z-grade material, wherein in the third material has an atomic number that is less than the atomic number of the first material; and
   a fifth layer between the first and fourth layers, wherein a density of material in the fifth layer increases along a gradient from the first layer to the fourth layer.

15. The apparatus of claim 14, wherein the third material is the same as the second material.

16. The apparatus of claim 15, wherein the fifth layer is thinner than the third layer.

17. The apparatus of claim 16, wherein the thickness of the third layer is at least 10% of the thinner of the first and second layers.

18. The apparatus of claim 17, wherein the third layer is at least as thick as the thinner of the first and second layers.

19. The apparatus of claim 18, wherein the third layer is at least 5 mil in thickness.

20. The apparatus of claim 13, wherein the third material is aluminum.

* * * * *